United States Patent [19]
Vanhoye et al.

[11] Patent Number: 5,908,908
[45] Date of Patent: Jun. 1, 1999

[54] PRESSURE-SENSITIVE ADHESIVE POLYMERS

[75] Inventors: Didier Vanhoye; Denis Melot, both of Bernay; Jean Lebez, Evreuz; Cyril Wiegert, Bernay, all of France

[73] Assignee: Elf Atochem S.A., France

[21] Appl. No.: 08/903,151

[22] Filed: Jul. 30, 1997

[30] Foreign Application Priority Data

Jul. 31, 1996 [FR] France ................................. 96 09663

[51] Int. Cl.$^6$ ..................................... C08F 20/10
[52] U.S. Cl. ................ 526/318.4; 526/286; 526/287; 526/302; 526/317.1
[58] Field of Search ................ 526/318.4, 286, 526/287, 302, 317.1

[56] References Cited

U.S. PATENT DOCUMENTS

| | | | |
|---|---|---|---|
| 5,070,164 | 12/1991 | Min et al. | 526/318.4 |
| 5,202,375 | 4/1993 | Biale | 524/562 |
| 5,536,787 | 7/1996 | Scholz et al. | 525/221 |

FOREIGN PATENT DOCUMENTS

| | | | |
|---|---|---|---|
| 60-122768 | 7/1985 | Japan | 526/318.4 |
| 60-122769 | 7/1985 | Japan | 526/318.4 |
| 60-235815 | 11/1985 | Japan | 526/318.4 |

*Primary Examiner*—Bernard Lipman
*Assistant Examiner*—N. Sarofim
*Attorney, Agent, or Firm*—Millen, White, Zelano & Branigan

[57] ABSTRACT

This pressure-sensitive adhesive polymer is obtained by emulsion polymerization of the mixture of the following monomers, for a total of 100% by weight: (A) 40 to 95% by weight of at least one (meth)acrylic or vinyl monomer capable of resulting in a homopolymer which has a glass transition temperature lower than or equal to −40° C.; (B) 2 to 50% by weight of at least one (meth)acrylic or vinyl monomer capable of resulting in a homopolymer which has a glass transition temperature higher than or equal to 0° C.; (C) 0.5 to 6% by weight of at least one carboxylic (meth) acrylic monomer; (D) 0 to 5% by weight of at least one (meth)acrylic monomer ethoxylated with 1 to 20 moles of ethylene oxide; (E) 0.05 to 1% by weight of at least one (meth)acrylic or vinyl monomer containing a ureido group; and (F) 0 to 2% by weight of at least one acrylic or vinyl monomer carrying a sulphonate functional group, the said polymer having a glass transition temperature lower than or equal to −25° C.

22 Claims, 1 Drawing Sheet

PRESSURE-SENSITIVE ADHESIVE POLYMERS

FIELD OF THE INVENTION

The present invention relates to pressure-sensitive adhesive polymers exhibiting a very good adhesion/cohesion compromise.

BACKGROUND OF THE INVENTION

Pressure-sensitive adhesives in aqueous phase have experienced considerable development since the beginning of the 1970s, to replace the products in solution form, constrained by the new environmental regulations and increases in solvent prices.

Pressure-sensitive adhesives must have the following general characteristics:

be capable of deforming under low pressures to obtain immediate wetting of the surface;

possess sufficient viscoelastic properties to retain a permanent position after removal of the applied force.

The bonds formed by these adhesives with the substrate are of relatively low energy and many applications require a degree of cohesion which is greater than that of the adhesion (peel, tack) to obtain an adhesive failure of the surface.

The ability of a pressure-sensitive adhesive to wet a surface well can be correlated with its glass transition temperature (Tg) and with its molecular mass. In general, obtaining a Tg lower than −25° C., or even than −40° C., by copolymerization of acrylic and/or vinyl monomers in the presence of transfer agents allows the desired level of tack to be obtained.

However, the influence of the Tg and of the molecular mass on the adhesive properties run counter to their influence on cohesion.

To improve the cohesive strength of pressure-sensitive adhesives without impairing the adhesive properties, a very slight crosslinking is often employed by the use of multifunctional monomers, as described in "Recent developments in acrylic polymers for latex adhesives" RAPRA 1981, Volume 18, No. 5, Abst. 7761431c.

The incorporation of chelating monomers has also been described in international application WO 91/02759, in order to increase the cohesion of pressure-sensitive adhesives after formulation of the latter with aluminium acetate.

Post-addition of such additives (Zn(Ac)$_2$, Al(Ac)$_3$) is furthermore often employed to increase the degree of cohesion of polymers containing carboxylic functional groups. However, the use of highly carboxylated latices presents problems of synthesis and of application. In fact, copolymerization of acrylic and methacrylic acid monomers in a weight proportion of polymer higher than 6% gives rise to instability problems and entails a drop in the peel strength. Furthermore, the large difference in Tg between the acids and their salts makes the Tg of the resulting composition highly sensitive to pH variations.

The search for a good adhesion/cohesion compromise therefore continues to remain one of the preoccupations of the formulators. In this context any solution that makes it possible to improve the cohesion of a pressure-sensitive adhesive without resulting in a fall in the adhesive properties, and at a cost which is compatible with the application, offers an obvious advantage.

SUMMARY OF THE INVENTION

It has now surprisingly discovered that a pressure-sensitive adhesive exhibiting a high degree of cohesion associated with good adhesive peel strength and tack properties can be obtained by copolymerization of a small quantity of (meth)acrylic or vinyl monomer containing a ureido group associated with a monomeric structure containing a monomer of Tg $\geq 0°$ C., a monomer of low Tg, a monomer of unsaturated carboxylic acid type and a (meth) acrylic monomer which has a given ethoxylated structure, at an overall Tg of the copolymer which is lower than or equal to −25° C.

The high cohesive strength results from the introduction of the monomer(s) with a ureido structure, and the cohesion/adhesion compromise which is low is obtained by modifying the Tg of the copolymer and the nature of the monomeric composition.

While the use of (meth)acrylic or vinyl monomers with a ureido structure is well known to improve the adhesion, and more particularly the wet adhesion of aqueous coatings, and to limit formaldehyde emissions in textile dispersions, no document has been found in the literature describing the use of these monomers to increase the cohesive strength of a pressure-sensitive adhesive. Nevertheless, in International Application 91/02759 the use of ethylimidazolidone methacrylamide in the polymer composition of Example 18 is noted, but without it being possible to ascertain a positive effect of this monomer, the increase in the cohesion being contributed by acetoacetoxyethyl methacrylate.

The subject-matter of the present invention is therefore a pressure-sensitive adhesive polymer obtained by emulsion polymerization of the mixture of the following monomers, for a total of 100% by weight:

(A) 40 to 95%, preferably 50 to 65%, by weight of at least one (meth)acrylic or vinyl monomer capable of producing a homopolymer which has a glass transition temperature lower than or equal to −40° C.;

(B) 2 to 50%, preferably 25 to 45%, by weight of at least one (meth)acrylic or vinyl monomer capable of producing a homopolymer which has a glass transition temperature higher than or equal to 0° C.;

(C) 0.5 to 6%, preferably 1 to 3%, by weight of at least one carboxylic (meth)acrylic monomer;

(D) 0 to 5%, preferably 0 to 3%, by weight of at least one (meth)acrylic monomer ethoxylated with 1 to 20 moles, in particular 1 to 5 moles, of ethylene oxide;

(E) 0.05 to 1%, preferably 0.1 to 0.5%, by weight of at least one (meth)acrylic or vinyl monomer containing a ureido group; and (F) 0 to 2%, preferably 0.5 to 1.5%, by weight of at least one acrylic or vinyl monomer carrying a sulphonate functional group, the said polymer having a glass transition temperature lower than or equal to −25° C., preferably lower than or equal to −40° C.

The monomers (A) exhibit a glass transition temperature which is generally between −40° C. and −80° C.; they are chosen especially from butyl acrylate, n-octyl acrylate, isooctyl acrylate, 2-ethylhexyl acrylate and 2-ethylhexyl versatate. A particularly preferred monomer A is 2-ethylhexyl acrylate.

The monomers (B) exhibit a glass transition temperature which is generally between 10° C. and 105° C.; they are chosen especially from methyl acrylate, butyl methacrylate, methyl methacrylate and vinyl acetate. Particularly preferred monomers (B) are methyl methacrylate, methyl acrylate, vinyl acetate and mixtures thereof.

The monomer (C) is especially acrylic acid or methacrylic acid, acrylic acid being preferred.

Examples of monomers (D), which are optional, which may be mentioned are methoxyethyl acrylate, ethyldiglycol acrylate and ethyltriglycol methacrylate, the last one being preferred. The monomers (D) enable the loop tack and peel strength properties to be increased.

Ethylimidazolidone (meth)acrylate, ethylimidazolidone (meth)acrylamide and 1-[2-[[2-hydroxy-3-(2-propenyloxy) propyl]amino]ethyl]-2-imidazolidone may be mentioned in particular among the monomers (E) containing a ureido group. Among these, ethylimidazolidone methacrylate is preferred.

Among the monomers (F) containing a sulphonate group there may be mentioned in particular sodium vinylsulphonate, sodium acrylamidomethylsulphonate and sodium allyl ether sulphonate. Among these, sodium vinylsulphonate is preferred. The monomers (F) make it possible to improve the colloidal stability of the dispersions for pressure-sensitive adhesive polymers, as well as the substrate-wetting properties.

The polymers according to the invention are prepared by emulsion polymerization in conditions which are well known to a person skilled in the art. The reaction is thus preferably conducted under inert atmosphere in the presence of radical initiators. The initiation system employed may be a redox system such as $K_2S_2O_8$, $(NH_4)_2S_2O_8/Na_2S_2O_5$, $Na_2SO_3$ or a thermal system such as $(NH_4)_2S_2O_8$, the quantities employed being between 0.2 and 1.0% by weight relative to the total mass of the monomers, preferably between 0.25 and 0.5% by weight.

The emulsion polymerization reaction according to the invention is conducted at a temperature of between 65 and 85° C. and depends on the nature of the initiation system applied: 65–75° C. in the case of the redox systems based on peroxodisulphate and metabisulphite, 70–85° C. in the case of the thermal systems based on peroxodisulphate alone.

The preparation of the dispersion according to the invention is preferably performed according to a process of semicontinuous type, making it possible to limit the drifts in composition which are a function of the differences in reactivity of the various monomers. The introduction of the monomers in the form of a pre-emulsion with a portion of the water and of the surfactants is thus generally carried out over a period of time from 3 hours 30 to 5 hours. It is also useful, although not indispensable, to perform a seeding of 5 to 15% of the monomers. The emulsifying systems employed in the emulsion polymerization process according to the invention are chosen from the range of emulsifiers that possess an appropriate hydrophilic/lipophilic balance. The preferred systems consist of the association of an anionic surfactant, such as sodium lauryl sulphate, nonylphenol sulphate ethoxylated in particular with 20–25 moles of ethylene oxide, dodecylbenzenesulphonate and ethoxylated fatty alcohol sulphates, and of a nonionic surfactant such as nonylphenols ethoxylated in particular with 10–40 moles of ethylene oxide and ethoxylated fatty alcohols.

The total quantity of emulsifier is within the range of 2 to 4% by weight and preferably of 2.5 to 3.7% by weight relative to the monomers. The best results are obtained by employing weight proportions of anionic surfactant/nonionic surfactant ranging from 25/75 to 60/40, depending on the nature of the monomers employed.

The polymer dispersions intended to be applied as pressure-sensitive adhesives according to the invention are preferably synthesized for high solids contents, of the order of 50 to 65% by weight, to permit quick drying on application.

To obtain solids contents higher than 60% it is furthermore preferable to control the sequences of addition of surfactants well so as to obtain the appropriate particle size distribution, to avoid a viscosity which is too high.

In order to obtain better applicability to the substrates it is preferable to adjust the rheology by the addition of a suitable thickener in small quantities: generally smaller than 0.2% by weight relative to the final dispersion. It is also possible, though not indispensable, to add a tackifying agent, to improve the adhesion to nonpolar substrates such as polyethylene.

The polymers obtained in the process according to the invention produce pressure-sensitive adhesives which exhibit a high degree of cohesion while retaining good peel strength and tack values. These novel adhesives can thus be employed to replace the polymers in a solvent phase which are costly and detrimental to the environment.

As already indicated, the large increase in the cohesive strength is obtained by copolymerization of at least one monomer containing a pendent ureido group, such as ethylimidazolidone methacrylate. The monomers which possess these highly polar ureido groups may be the source of polar associations, such as hydrogen or dipoledipole bonds, which will contribute to an appreciable increase in the molecular mass and will thus play a part in the viscoelastic properties of the adhesive.

The copolymerization of the ureido monomer can be performed according to a semicontinuous process in a single stage, as well as according to a semicontinuous two-stage process, where the ureido monomer is preferably distributed in the second stage without, however, ruling out its use in the first stage.

To maintain the necessary peel strength and tack properties with good cohesive properties it is preferable to adjust the molecular mass of the polymer by employing an appropriate quantity of a transfer agent such as alkyl mercaptans (tert-dodecyl mercaptan, n-dodecyl mercaptan), alkyl mercaptopropionates or thioglycolic acid. The quantities of transfer agent according to the invention can range up to 0.25% by weight relative to the monomers, being especially between 0.01% and 0.25% by weight of the monomers, preferably from 0.05 to 0.2% by weight. It is also possible to increase the quantity of initiator employed, to reduce the molecular mass.

It has also been demonstrated that the association of at least one ethoxylated acrylic monomer as defined above makes it possible to contribute to the preservation of good peel strength and tack properties besides the good cohesive properties contributed by the monomer(s) with a ureido structure.

The high cohesive strength associated with the adhesives according to the present invention also makes them compatible with the use of tackifiers employed to increase adhesion to substrates of low surface energy, such as polyolefins.

The dispersions according to the invention can be employed alone in order to result in the formulation of pressure-sensitive adhesives that have the desired properties, and also mixed with other dispersions in formulation conditions that are judged to be optimal for the application.

Accordingly, the present invention also relates to an adhesive consisting of, or including, at least one dispersion of a polymer as defined above. It is possible, for example, to mention an adhesive consisting of a mixture (1) of at least one dispersion of a polymer as defined above and (2) of at least one dispersion of a polymer obtained by emulsion polymerization of the mixture of the monomers (A), (B), (C) and optionally (D) and (F), which are as defined above.

In particular it is possible to mention an adhesive consisting of the mixture of (1) and (2) above, (1) representing at least 40% by weight of the said mixture.

The present invention will now be described with the aid of examples and of comparative examples. In these examples all the "parts" and all the percentages are by weight, unless indicated otherwise.

EXAMPLE 1 (comparative)

Into a 3-liter reactor fitted with a central mechanical stirrer and a nitrogen delivery, and supporting a condenser, are introduced 36.8 parts of demineralized water, 0.265 parts of nonylphenol polyoxyethylenated with 10 moles of ethylene oxide (marketed under the trademark Synthopon®) and 0.09 parts of sodium lauryl sulphate (marketed under the trademark Texapon®). The reactor is then degassed by circulating nitrogen and its content is raised to 70° C. with the aid of a water bath. Next, 0.35 parts of sodium metabisulphite are introduced, and then a preemulsion is added which has the following composition:

2-Ethylhexyl acrylate . . . 56 parts
Methyl acrylate . . . 41.5 parts
Acrylic acid . . . 2.5 parts
Demineralized water . . . 37.8 parts
n-Dodecyl mercaptan . . . 0.1 parts
Nonylphenol polyoxyethylenated with 10 moles of ethylene oxide (Synthopon®) . . . 2.39 parts
Sodium lauryl sulphate (Texapon®) . . . 0.81 parts as well as a solution of 0.35 parts of ammonium peroxodisulphate in 6 parts of demineralized water, over 3 h 30 min with stirring (100 rev/min).

When the additions are finished the reaction mixture is kept at 70° C. for 1 h 30 min and is then allowed to cool to ambient temperature.

The dispersion obtained has the following characteristics:
Brookfield viscosity at 29° C.: 480 mPa s
Mean particle size: 214 nm
Solids content: 55.2%.

EXAMPLE 2 (comparative)

The procedure of Example 1 is repeated, a preemulsion which has the following composition being incorporated:

2-Ethylhexyl acrylate . . . 56 parts
Methyl acrylate . . . 38.5 parts
Acrylic acid . . . 2.5 parts
Demineralized water . . . 37.8 parts
n-Dodecyl mercaptan . . . 0.1 parts
Nonylphenol polyoxyethylenated with 10 moles of ethylene oxide (Synthopon®) . . . 2.39 parts
Sodium lauryl sulphate (Texapon®) . . . 0.81 parts
Ethyltriglycol methacrylate . . . 3 parts The dispersion obtained has the following characteristics:
Brookfield viscosity at 230° C.: 930 mPa s
Mean particle size: 130 nm
Solids content: 56.1%.

EXAMPLE 3 (comparative)

The procedure of Example 2 is repeated, the 3 parts of ethyltriglycol methacrylate being replaced with 3 parts of methoxyethyl acrylate.

The dispersion obtained has the following characteristics:
Brookfield viscosity at 23° C.: 620 mPa s
Mean particle size: 202 nm
Solids content: 55.1%.

EXAMPLES 4 to 6

The procedure of Example 1 is repeated, increasing quantities of ethylimidazolidone methacrylate being added to the composition of the preemulsion.

These quantities and the characteristics of the dispersions obtained are shown in Table 1 below.

TABLE 1

| Example | 4 | 5 | 6 |
|---|---|---|---|
| Ethylimidazolidone methacrylate (parts) | 0.2 | 0.5 | 1.0 |
| Brookfield viscosity at 23° C. (mPa s) | 500 | 475 | 920 |
| Mean particle size (nm) | 227 | 231 | 165 |
| Solids content (%) | 55.6 | 54.8 | 54.2 |

EXAMPLE 7

The procedure of Example 4 is repeated, the ethylimidazolidone methacrylate being replaced with a formulation containing 20% of the latter in methyl methacrylate (formulation marketed by Elf Atochem under the trademark "Norsocryl®100").

The dispersion obtained has the following characteristics:
Brookfield viscosity at 23° C.: 475 mPa s
Mean particle size: 200 nm
Solids content: 55.7%.

EXAMPLE 8

The procedure of Example 5 is repeated, the ethylimidazolidone methacrylate being replaced with ethylimidazolidone methacrylamide.

The dispersion obtained has the following characteristics:
Brookfield viscosity at 23° C.: 550 mPa s
Mean particle size: 195 nm
Solids content: 56.0%.

EXAMPLES 9 to 11

The procedure of Example 1 is repeated, the monomer compositions shown in Table 2 below being employed. The characteristics of the dispersions obtained are also shown in this table.

TABLE 2

| Example | 9 | 10 | 11 |
|---|---|---|---|
| Monomer composition (parts) | | | |
| Methyl acrylate | 40.4 | 40.4 | 33.6 |
| 2-Ethylhexyl acrylate | 53.8 | 53.8 | 60.6 |
| Acrylic acid | 2.5 | 2.5 | 2.5 |
| Ethyltriglycol methacrylate | 3 | 3 | 3 |
| Ethylimidazolidone methacrylate | 0.3 | 0.3 | 0.3 |
| Dodecyl mercaptan | 0.1 | 0.2 | 0.1 |
| Brookfield viscosity at 23° C. (mPa s) | 550 | 310 | 775 |
| Mean particle size (nm) | 212 | 239 | 205 |
| Solids content (%) | 55.8 | 55.8 | 55.8 |

EXAMPLE 12

Measurements of peel strength, of loop tack and of creep were conducted with the dispersions obtained in accordance with Examples 1 to 11. The results are reported in Table 3 below.

TABLE 3

| Example | 1 (comparative) | 2 (comparative) | 3 (comparative) | 4 | 5 | 6 | 7 | 8 | 9 | 10 | 11 |
|---|---|---|---|---|---|---|---|---|---|---|---|
| Peel Strength according to FTM*1 (N/cm) | 2.6 | 3.9 | 3.7 | 1.2 | 0.8 | 0.1 | 1.1 | 0.8 | 5.8 | 5.0 | 5.4 |
| Loop tack according to FTM9 (N/cm) | 3.0 | 3.5 | 3.7 | 1.0 | 0.6 | 0.8 | 1.0 | 0.5 | 3.8 | 3.0 | 3.0 |
| Creep according to FTM8 (min) | 1364 | 968 | 724 | 16180 | >60000 | >45000 | 18000 | >45000 | 36000 | 21250 | >45000 |

*FTM: Final Test Method: October 1995

EXAMPLE 13 (comparative)

The procedure of Example 1 is repeated, a preemulsion which has the following composition being incorporated:

2-Ethylhexyl acrylate . . . 75.7 parts

Vinyl acetate . . . 18 parts

Acrylic acid . . . 5.3 parts

Sodium vinylsulphonate . . . 1 parts

Demineralized water . . . 34.7 parts

Anionic surfactant marketed by Rhône-Poulenc under the name "Adex 26 S" . . . 5.71 parts Nonylphenol ethoxylated with 25 moles of ethylene oxide, marketed by Witco under the name "Rewopal HV 25" . . . 2.50 parts The dispersion obtained has the following characteristics:

Brookfield viscosity at 23° C.: 1500 mPa s

Mean particle size: 208 nm

Solids content: 56.1%

EXAMPLE 14

The procedure of Example 13 is repeated, 1.5 parts of vinyl acetate being replaced with 1.5 parts of a formulation comprising 20% of ethylimidazolidone methacrylate in methyl methacrylate (formulation marketed by Elf Atochem under the trademark "Norsocryl 100").

The dispersion obtained has the following characteristics:

Brookfield viscosity at 23° C.: 1640 mPa s

Mean particle size: 205 nm

Solids content: 55.7%.

EXAMPLE 15

Measurements of peel strength, of loop tack and of creep were conducted with the dispersions obtained in accordance with Examples 13 and 14. The results are reported in Table 4 below.

TABLE 4

| Example | 13 (comparative) | 14 |
|---|---|---|
| Peel strength according to FTM1 (N/cm) | 2.5 | 2.7 |
| Loop tack according to FTM9 (N/cm) | 3.3 | 4.7 |
| Creep according to FTM8 (min) | 3000 | >30 000 |

EXAMPLES 16 (comparative) and 17

The procedure of Example 1 is repeated, the monomer compositions shown in Table 5 below being employed. The characteristics of the dispersions obtained also appear in this table.

TABLE 5

| Example | 16 (comparative) | 17 |
|---|---|---|
| Monomer composition (parts) | | |
| 2-Ethylhexyl acrylate | 93.5 | 95.0 |
| Acrylic acid | 2.5 | 2.5 |
| Methyl methacrylate | 4.0 | — |
| Ethylimidazolidone methacrylate formulated as 20% in methyl methacrylate (Norsocryl 100) | — | 2.5 |
| Brookfield viscosity at 23° C. (mPa s) | 1550 | 960 |
| Mean particle size (nm) | 150 | 182 |
| Solids content (%) | 54 | 55 |

EXAMPLE 18

Measurements of peel strength, of loop tack and of creep were conducted with the dispersions obtained in accordance with Examples 16 and 17. The results are reported in Table 6 below.

TABLE 6

| Example | 16 (comparative) | 17 |
|---|---|---|
| Peel strength according to FTM1 (N/cm) | 3.0 | 1.5 |
| Loop tack according to FTM9 (N/cm) | 3.2 | 3.0 |
| Creep according to FTM8 (min) | 73 | >30,000 |

EXAMPLES 19 (comparative) and 20

The procedure of Example 1 is repeated, the numerical compositions shown in Table 7 below being employed. The characteristics of the dispersions obtained are also shown in this table.

TABLE 7

| Example | 19 (comparative) | 20 |
|---|---|---|
| Monomer composition (parts) | | |
| 2-Ethylhexyl acrylate | 97.5 | 92.5 |
| Acrylic acid | 2.5 | 2.5 |
| Formulation containing 20% of ethylimidazolidone | 0 | 5 |

TABLE 7-continued

| Example | 19 (comparative) | 20 |
|---|---|---|
| methacrylate in methyl methacrylate | | |
| Solids content (%) | 55 | 55 |
| Brookfield viscosity at 23° C. (mPa s) | 110 | 550 |
| Mean particle size (nm) | 100 | 100 |

EXAMPLE 21

Applicative Evaluation of the Latices According to Example 19 (comparative) and According to Example 20 and of Mixtures of these Two Latices Measurements of creep and of bond strength were conducted with the latices obtained in accordance with Example 19 (comparative) and 20 and with various mixtures of these latices. The results are reported in Table 8 below.

TABLE 8

| Content of the latex of Example 20 | Creep according to FTM8 (min) | Instant tack Adhesion energy (J/m²) |
|---|---|---|
| 0 (Comparative Example 19) | 70 | 320 |
| 25 | 400 | 300 |
| 30 | 1300 | 270 |
| 35 | 8800 | 250 |
| 40 | >20 000 | 220 |
| 50 | >20 000 | 163 |
| 75 | >20 000 | 130 |
| 100 | >20 000 | 110 |

*Measured in accordance with the method described below

The measurement of the energy of adhesion, which allows the adhesives to be classified according to the instant tack which they exhibit during a short and weak application of a probe, tests at the same time the surface properties and the viscoelastic properties in adhesive failure, without cohesive failure. The method of measurement will now be described with reference to the appended drawing, in which:

DETAILED DESCRIPTION OF DRAWINGS

A film (1) of each adhesive to be studied is applied onto a previously degreased aluminium panel (2). The panels thus coated are stored to dry in a controlled-environment room with a constant ambient humidity for 48 hours. Next, a probe or punch (3) is applied to the adhesives in precise conditions of time of contact of the punch on the adhesive ($t_c$), of force of contact (F) and of speed of rise of the punch (v).

Figure 1:
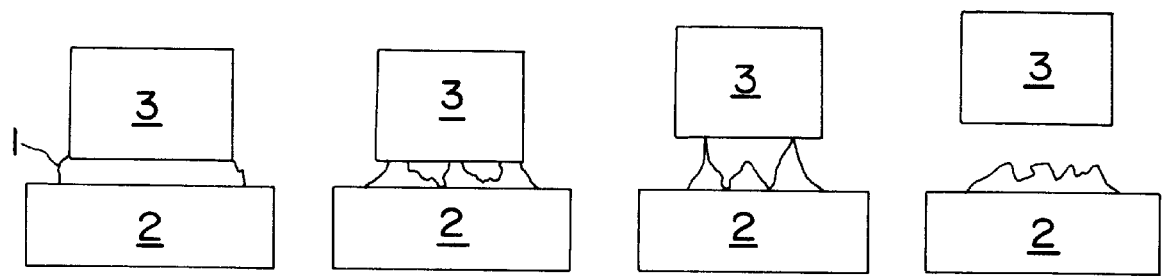
FIG. 1 illustrates diagrammatically the procedure for a measurement; of the adhesion
Figure 2:
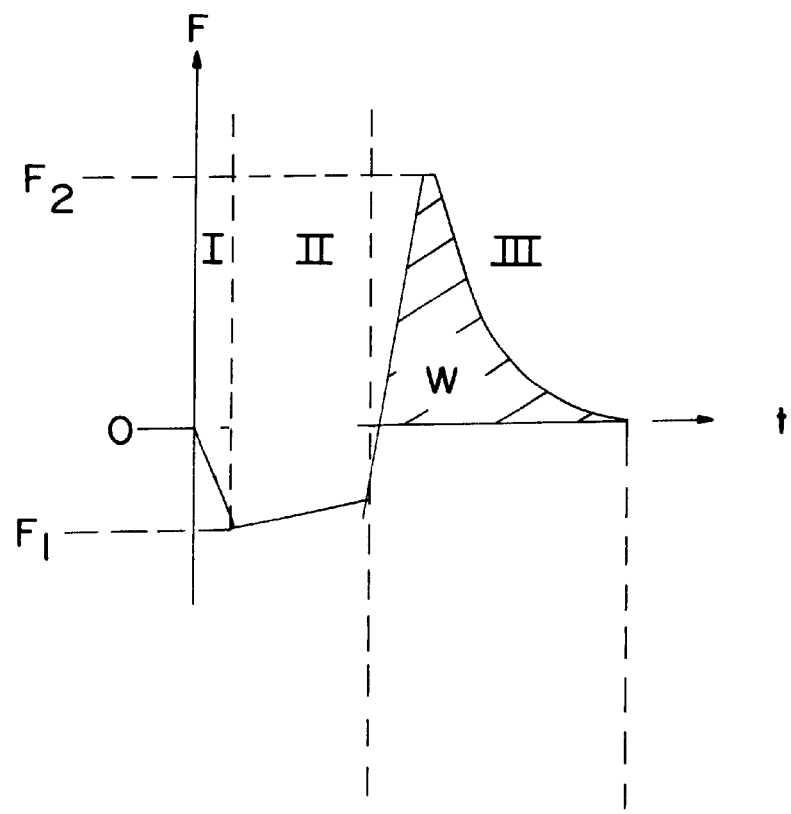
FIG. 2 is a diagram of the change with time of the stress applied to the adhesive.

The change with time of the stress (F) applied to the adhesive is recorded with the following probe parameters (cf FIG. 2):

I: period of application of the stress
II: period of relaxation (formation of the bond)
III: traction (separation of the bond).

The calculated energy of adhesion (W) corresponds to the area under the curve (after the time/movement correspondence has been established).

The latex of Comparative Example 19 is very tacky and not at all cohesive.

The mixture of the two latices makes it possible to reach a performance compromise around 40% of the latex of Example 20 of the invention, it being known that the instant tack is judged to be satisfactory from 200 J/m² onwards.

The preceding examples can be repeated with similar success by substituting the generically or specifically described reactants and/or operating conditions of this invention for those used in the preceding examples.

The entire disclosure of all applications, patents and publications, cited above, and of corresponding French application 96/09663, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. Pressure-sensitive adhesive polymer obtained by emulsion polymerization of a mixture of the following monomers, for a total of 100% by weight:
   (A) 40 to 95% by weight of at least one (meth)acrylic or vinyl monomer capable of resulting in a homopolymer which has a glass transition temperature lower than or equal to −40° C.;
   (B) 2 to 50% by weight of at least one (meth)acrylic or vinyl monomer capable of resulting in a homopolymer which has a glass transition temperature higher than or equal to 0° C.;
   (C) 0.5 to 6% by weight of at least one carboxylic (meth)acrylic monomer;
   (D) 0 to 5% by weight of at least one (meth)acrylic monomer ethoxylated with 1 to 20 moles of ethylene oxide;
   (E) 0.05 to 1% by weight of at least one (meth)acrylic or vinyl monomer containing a ureido group; and
   (F) 0 to 2% by weight of at least one acrylic or vinyl monomer carrying a sulphonate functional group, the said polymer having a glass transition temperature lower than or equal to −25° C.

2. A polymer according to claim 1, obtained by emulsion copolymerization of:
   50 to 65% by weight of (A);
   25 to 45% by weight of (B);
   1 to 3% by weight of (C);
   0 to 3% by weight of (D);
   0.1 to 0.5% by weight of (E); and
   0.5 to 1.5% by weight of (F).

3. A polymer according to claim 1 having a glass transition temperature lower than or equal to −40° C.

4. A polymer according to claim 1, wherein the at least one monomer (A) is butyl acrylate, n-octyl acrylate, isooctyl acrylate, 2-ethylhexyl acrylate or 2-ethylhexyl versatate.

5. A polymer according to claim 1, wherein the at least one monomer (B) is methyl acrylate, butyl methacrylate, methyl methacrylate or vinyl acetate.

6. A polymer according to claim 1, wherein the at least one monomer (C) is acrylic acid or methacrylic acid.

7. A process of producing a polymer according to claim 1, comprising emulsion polymerizing said monomer in the presence of at least one transfer agent employed in a quantity ranging up to 0.25% by weight, relative to the monomers.

8. A process according to claim 7, wherein the transfer agent is an alkyl mercaptan, an alkyl mercaptopropionate or thioglycolic acid.

9. A process according to claim 7, the polymerization of the monomer mixture being conducted in the presence of 2 to 4% by weight, relative to the monomers, of at least one emulsifying agent formed from a mixture of an anionic surfactant, and a nonionic surfactant with weight proportions of anionic surfactant/nonionic surfactant ranging from 25/75 to 60/40.

10. An adhesive composition comprising at least one dispersion of a polymer as defined in claim 1 and optionally at least one of a thickener and tackifying agent.

11. An adhesive composition according to claim 10, further comprising at least one dispersion of a polymer obtained by emulsion polymerization of a mixture of the monomers (A), (B), (C) and, optionally, (D), and (F).

12. An adhesive composition according to claim 11, wherein the dispersions of the polymer represent at least 40% by weight of the mixture.

13. An adhesive composition according to claim 10, wherein the polymer dispersion has a solids content of 50–65%.

14. An adhesive composition according to claim 10, containing said thickener.

15. An adhesive composition according to claim 10, containing said tackifying agent.

16. An article of manufacture comprising two substrates bonded by the adhesive composition of claim 10.

17. In a method comprising bonding two substrates with an adhesive, the improvement wherein said adhesive is an adhesive composition according to claim 10.

18. A polymer according to claim 4, wherein the at least one monomer (B) is methyl acrylate, butyl methacrylate, methyl methacrylate or vinyl acetate; (C) is acrylic acid or methacrylic acid; and (E) is ethylimidazolidone (meth)acrylate, ethylimidazolidone (meth)acrylamide or 1-[2-[[2-hydroxy-3-(2-propenyloxy)-propyl]amino]ethyl]-2-imidazolidone.

19. A polymer according to claim 18, wherein the at least one monomer (D) is methoxyethyl acrylate, ethyldiglycol acrylate or ethyl-triglycol methacrylate, said monomer being provided in an amount above 0%.

20. A process according to claim 9, wherein the anionic surfactant is sodium lauryl sulphate, nonylphenol sulfate ethoxylated with 20–25 moles of ethylene oxide dodecylbenzene sulphonate or an ethoxylated fatty alcohol, and the non-ionic surfactant is a nonylphenol ethoxylated with 10–40 moles of ethylene oxide or an ethoxylated fatty alcohol.

21. A polymer according to claim 1, wherein the at least one monomer (E) is ethylimidazolidone (meth)acrylate, ethylimidazolidone (meth)acrylamide or 1-[2-[[2-hydroxy-3-(2-propenyloxy)-propyl]amino]ethyl]-2-imidazolidone, said monomer being provided in an amount above 0%.

22. A polymer according to claim 1, wherein the at least one monomer (E) is ethylimidazoidone (meth)acrylate, ethylimidazolidone (meth)acrylamide or 1-[2-[[2-hydroxy-3-(2-propenyloxy)-propyl]amino]ethyl]-2-imidazolide.

* * * * *